US007703087B1

(12) United States Patent
Prakash

(10) Patent No.: US 7,703,087 B1
(45) Date of Patent: Apr. 20, 2010

(54) REDUCING LAYOUT CONFLICTS AMONG CODE UNITS WITH CALLER-CALLEE RELATIONSHIPS

(75) Inventor: Raj Prakash, Saratoga, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1117 days.

(21) Appl. No.: 11/009,886

(22) Filed: Dec. 10, 2004

(51) Int. Cl.
*G06F 9/45* (2006.01)
(52) U.S. Cl. .................... 717/157; 717/158; 717/159
(58) Field of Classification Search .............. None
See application file for complete search history.

(56) References Cited

U.S. PATENT DOCUMENTS

| | | | |
|---|---|---|---|
| 5,655,122 A * | 8/1997 | Wu | 717/152 |
| 5,903,559 A * | 5/1999 | Acharya et al. | 370/355 |
| 5,978,588 A * | 11/1999 | Wallace | 717/159 |
| 6,073,213 A * | 6/2000 | Peled et al. | 711/125 |
| 6,301,652 B1 * | 10/2001 | Prosser et al. | 712/204 |
| 6,625,806 B1 * | 9/2003 | Ono et al. | 717/136 |
| 6,639,207 B2 * | 10/2003 | Yamamoto et al. | 250/231.14 |

OTHER PUBLICATIONS

"Reducing traffic generated by conflict misses in caches", Delangen et al., Apr. 2004, pp. 235-239, <http://delivery.acm.org/10.1145/980000/977123/p235-delangen.pdf>.*
"Cache conflict resolution through detection, analysis and dynamic remapping of active pages", Marko et al., Apr. 2000, pp. 60-66, <http://delivery.acm.org/10.1145/1130000/1127731/p60-marko.pdf>.*
"Performance, energy, and reliability tradeoffs in replicating hot cache lines", Zhang et al., Oct. 2003, pp. 309-317, <http://delivery.acm.org/10.1145/960000/951750/p309-zhang.pdf>.*
"Improving cache hit ratio by extended referencing cache lines", Wang et al., Apr. 2003, pp. 118-123, <http://delivery.acm.org/10.1145/770000/767619/p118-wang.pdf>.*
Gloy, Nikolas, et al., "Procedure Placement Using Temporal Ordering Information", IEEE Proceedings of Micro-30, Dec. 1-3, 1997, pp. 1-11.
Manjikian, Naraig and Abdelrahman, Tarek, "Array Data Layout for the Reduction of Cache Conflicts", Proceedings of the 8$^{th}$ International Conference on Parallel and Distributed Computing Systems, Sep. 1995, pp. 1-8.

(Continued)

*Primary Examiner*—Tuan Q Dam
*Assistant Examiner*—Thuy Dao
(74) *Attorney, Agent, or Firm*—Dorsey & Whitney LLP

(57) ABSTRACT

A code placement technique that organizes code units to at least reduce layout conflicts among caller/callee code units. A code preparation environment determines those code units of a code representation that have overlapping memory mappings with their counterpart caller/callee code units. To at least reduce the layout conflicts, or overlapping memory mappings, the code preparation environment arranges the caller/callee code units to eliminate the layout conflicts among the caller/callee code units.

34 Claims, 5 Drawing Sheets

OTHER PUBLICATIONS

Chilimbi, Trishul, et al., "CacheConscious Structure Layout", Proceedings of the ACM SIGPLAN '99 Conference on Programming Language Design and Implementation, May 1999, 12 pages.

Bartolini, S. and Prete, C.A., "A Software Strategy to Improve Cache Performance", Memory Access Decoupling for Superscalar and Multiple issue Architectures (MEDEA) Workshop, Oct. 19, 2000, 6 pages.

Bahar, Iris et al., "A Comparison of Software Code Reordering and Victim Buffers", 3rd Workshop on Interaction between Compilers and Computer Architectures, Oct. 7, 1998, pp. 1-6.

* cited by examiner

REDUCING LAYOUT CONFLICTS AMONG CODE UNITS WITH CALLER-CALLEE RELATIONSHIPS

BACKGROUND

1. Field of the Invention

The present invention relates to storing code into memory. More specifically, the present invention relates to structuring code to reduce layout conflicts between code units with a caller-callee relationship.

2. Description of the Related Art

Attempts to address the increasing gap between processors and memory have typically leaned towards reducing or tolerating latency. Techniques for reducing or tolerating latency include prefetching, dynamic instruction scheduling, and speculative execution. The tendency for application to be dominated by memory accesses limits the effectiveness of such techniques.

A more recent approach attempts to improve software reference locality. Software reference locality is improved by engineering code layout organization, referred to as code placement, during compile-time. Such techniques organize code in accordance with gathered profile information that indicates "hotness," of code blocks, or execution frequency, to reduce cache conflicts. The code-placement techniques reorganize an application at various levels of granularity based on a weighted graph. The weighted graph is constructed from profile information that indicates how often a code block is called. Although execution frequency is helpful, no code placement technique utilizes information indicating caller-callee relationships. Accordingly, a technique is desired that utilizes information pertaining to procedures that reference each other.

SUMMARY

It has been discovered that specifying code unit placement in based on caller-callee relationships among code units reduces layout conflicts in memory. A representation of code (e.g., an intermediate code representation) is analyzed to determine the caller-callee relationships between code units (e.g., functions, methods, procedures, libraries, etc.) in the code representation. The code representation is inspected to determine if layout conflicts occur between caller/callee code units. The code representation is then instrumented to at least reduce those layout conflicts. Instrumentation of the code representation may also be in accordance with profile information, such as temporal locality and spatial locality.

BRIEF DESCRIPTION OF THE DRAWINGS

The present invention may be better understood, and its numerous objects, features, and advantages made apparent to those skilled in the art by referencing the accompanying drawings.

FIG. 2A depicts an exemplary software tool arranging code units. FIG. 2B depicts a code representation generated by the software tool 205.

The use of the same reference symbols in different drawings indicates similar or identical items.

DESCRIPTION OF THE PREFERRED EMBODIMENT(S)

The description that follows includes exemplary systems, methods, techniques, instruction sequences and computer program products that embody techniques of the present invention. However, it is understood that the described invention may be practiced without these specific details. For instance, the description refers to intermediate code representations, although the described code placement technique may also be applied to a source code representation or executable code representation. In other instances, well-known protocols, structures and techniques have not been shown in detail in order not to obscure the invention.

The term code is used herein to refer to a group or sequence of operations or instructions, such as a program, a module, an application, etc. The term code unit is used to describe an identifiable granularity of code. For example, a code unit may be a procedure, a method, a function, a library file, etc. Regardless of a particular label, a code unit can be referenced or called by another code unit. Caller-callee relationship refers to a call relationship between code units and encompasses a code unit (caller) calling another code unit (callee), being called by another code unit, and code units that call each other.

Figure 1:
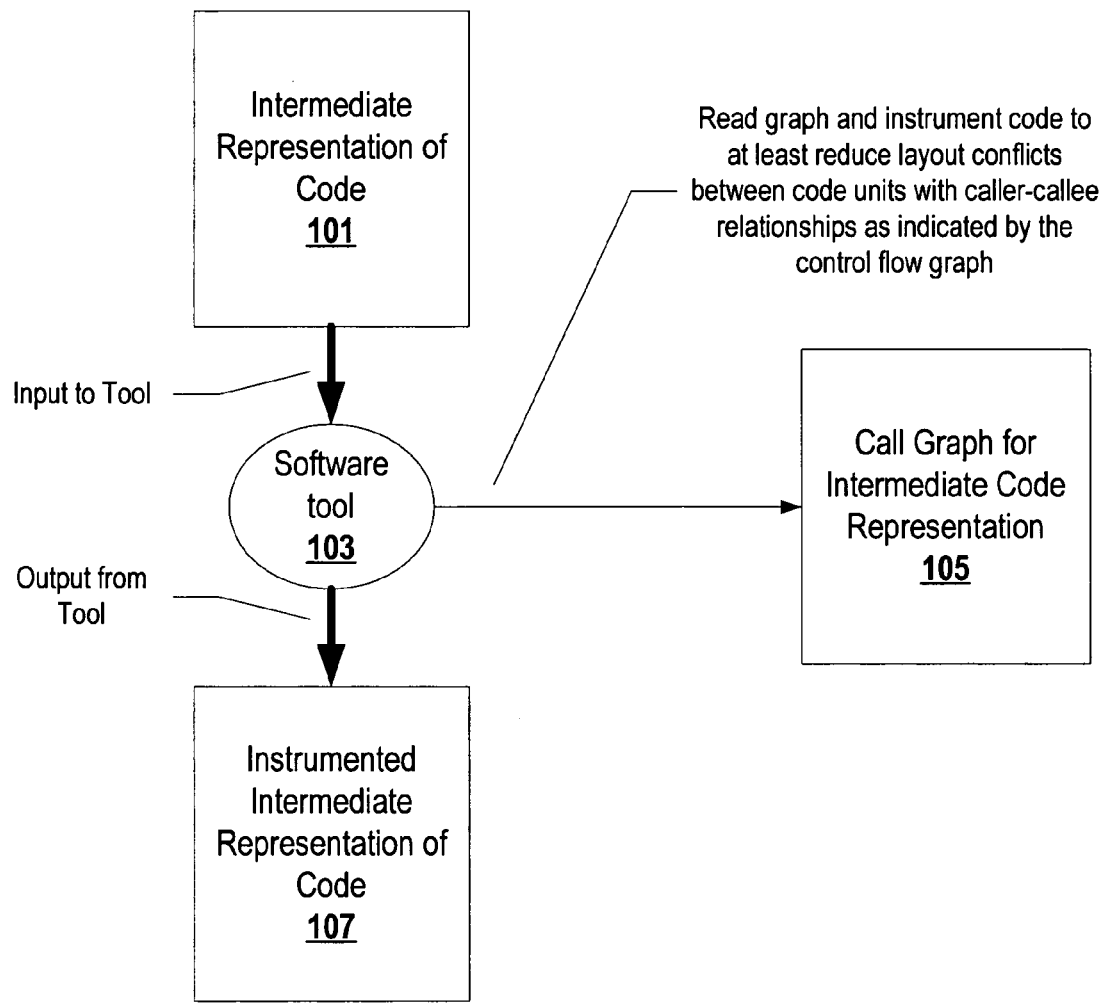
FIG. 1 depicts an exemplary software tool that instruments code to reduce layout conflicts among code units that reference each other.

FIG. 1 depicts an exemplary software tool that instruments code to reduce layout conflicts among code units that reference each other. An intermediate representation of code 101 (e.g., an object file generated by a compiler) is input into a software tool 103. The software tool 103 may be part of a code preparation environment (e.g., a compiler), a separate tool, part of a code execution environment (e.g., a runtime linker), etc. The software tool 103 reads a call graph 105 for the intermediate code representation. The call graph 105 indicates caller-callee relationships among code units of the intermediate code representation 101. The call graph 105 may be generated by the software tool 103 or a separate tool. The call graph 105 may be implemented with a variety of techniques (e.g., a tree, a hash table, multiple linked lists, etc.). The software tool 103 instruments the intermediate code representation 101 to reduce layout conflicts between the code units that have caller-callee relationships. The intermediate code representation 101 may be further instrumented by the software tool 103, or another tool, to reduce conflicts based on other criteria, such as spatial locality, temporal locality, etc. The software tool 103 generates an instrumented intermediate code representation 107. The instrumented intermediate code representation 107 may be a new representation or the intermediate code representation 101 as modified by the software tool 103.

Figure 2A:
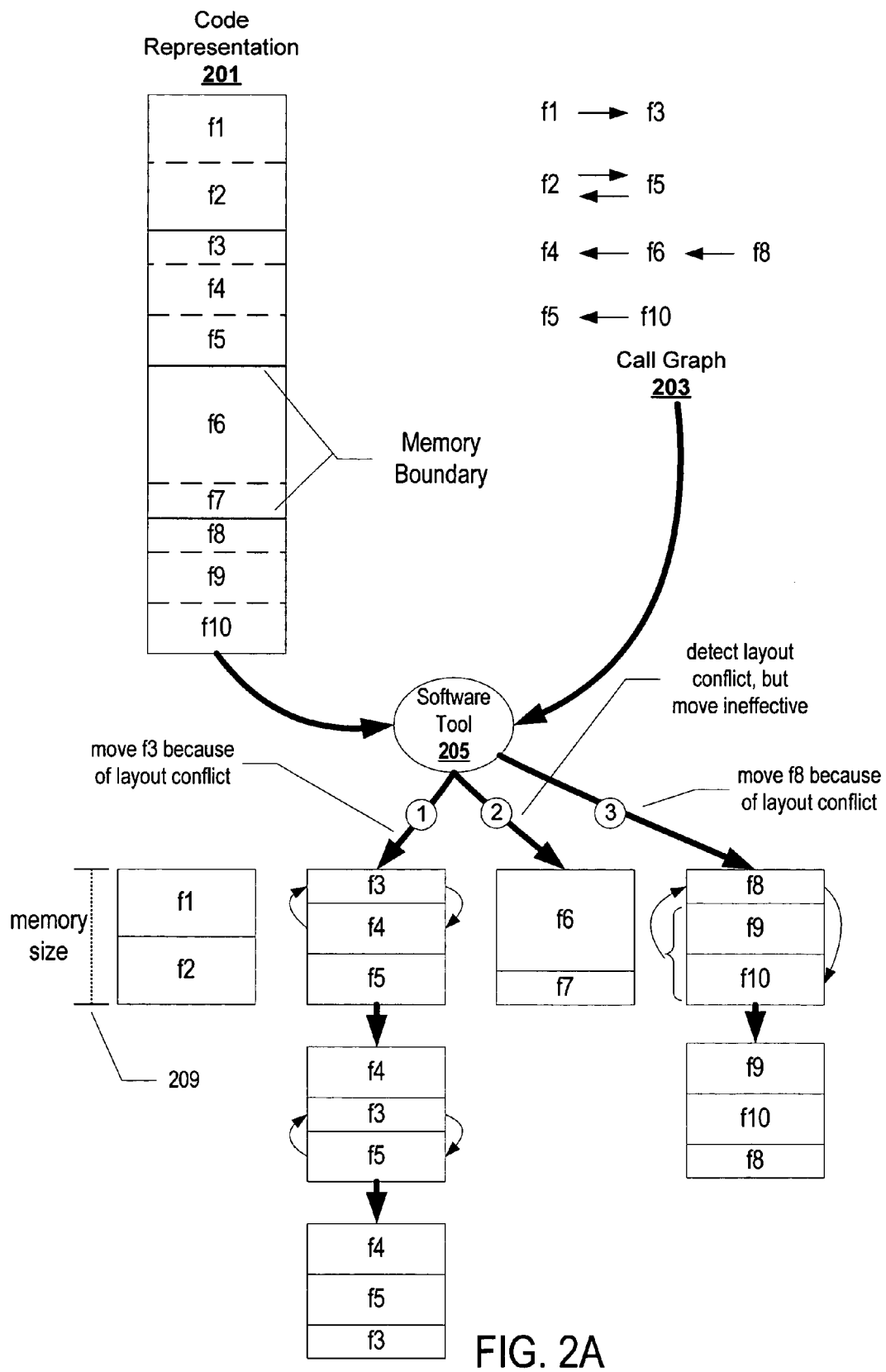
FIGS. 2A-2B depict a software tool arranging code units in a code representation to reduce layout conflicts among code units with caller-callee relationships.
Figure 2B:
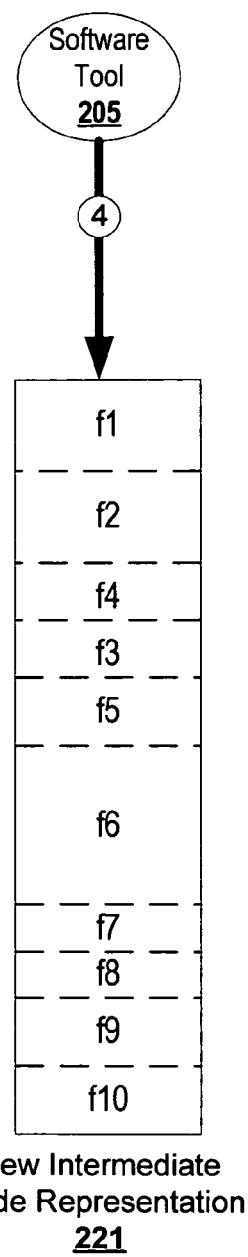

FIGS. 2A-2B depict a software tool arranging code units in a code representation to reduce layout conflicts among code units with caller-callee relationships. FIG. 2A depicts an exemplary software tool arranging code units. A code representation 201 includes code units f1-f10. The code units of the code representation 201 are arranged to be placed in accordance with memory boundaries. The code representation 201 includes indications of the memory boundary that corresponds to the size of a memory in a system to execute the code representation 101. For example, if the size of an instruction cache on a system that will execute the code representation 201 is 8 kilobytes, then code is arranged in the code representation 201 in accordance with the 8 kilobyte boundary. In FIG. 2A, the code units are organized into the following groups in accordance with an exemplary memory boundary: f1 and f2; f3-f5; f6 and f7; and f8-f10. A call graph 203 indicates the caller-callee relationships between the code units. According to the call graph 203, f1 calls f3, which calls f8. The code units f2 and f5 call each other. The code unit f6 calls the code unit f4. The code unit f10 calls f5.

A software tool 205 arranges the code units of the code representation 201 based on examination of the caller-callee relationships indicated by the call graph 203. At a time 1, the software tool 205 determines whether layout conflicts exist between the code units with caller-callee relationships in the first and second groups (i.e., the software tool 205 determines whether code units have the same memory mappings). For example, the tool may check whether the beginning and/or ending boundary of a code unit falls within the range of another code unit using addresses and/or offsets of the code units, perhaps performing a modulo with the size of the memory, such as cache line or page size. To illustrate, a first code unit may occur 64 kilobytes from the beginning of the intermediate code representation and end at 69 kilobytes from the beginning of the intermediate code representation. A second code unit occurs at 95 kilobytes. Assuming a cache size of 8 kilobytes, range of the first code unit is determined to be from 0 (64 mod 8) to 5 kilobytes (69 mod 8). The beginning boundary of the second code unit is determined to be 7 kilobytes (95 mod 8) and an ending boundary at 7.5 kilobytes (95.5 mod 8). Since the beginning and ending of the second code unit does not fall within the range of the first code unit, then the tool can determine that there is no conflict between the two code units. The ending boundary is determined to ensure that the second code unit does not wrap around and conflict with the first code unit. The above illustration is meant only to aid in understanding the invention, and not meant to be limiting upon the invention. A variety of techniques may be used to determine whether code units have layout conflicts (e.g., checking either the beginning boundary or the ending boundary or both the beginning and the end boundary, etc.).

According to the call graph 203, a caller-callee relationship exists between the code units f1 and f3. In addition, the software tool 205 determines that a layout conflict exists between f1 and 13. For example, the software tool 205 determines that the code units f1 and f3 will be mapped to an overlapping cache line, page, or segment, thus causing an eviction of one of the code units. Therefore, to avoid the layout conflict, the software tool 205 delays, or moves the code unit f3. A variety of techniques may be utilized to determine whether code units have overlapping memory mappings. For example, a data structure may be generated that represents the memory mappings and the code units, the code representation 201 may be annotated to indicate memory mappings, etc. In FIG. 2A, the software tool 205 swaps placement of the code units f3 and f4. However, the memory mapping for the code unit f3 still overlaps with the memory mapping of the code unit f1, so the software tool 205 arranges the code unit 13 to occur after the code unit f5. Now the code unit f3 does not overlap with the code unit f1. The code unit f3 overlaps with the code unit f2, but a caller-callee relationship does not exist between the code units f2 and f3. The amount of delay or movement applied to a code unit may be limited by other criteria, such as original placement according to hotness, other profile information, and/or spatial locality, which may be annotated in the call graph 203.

At a time 2, the software tool 205 detects a layout conflict between the code units f6 and f4, which have a caller-callee relationship. However, the software tool 205 determines that placing the code unit f6 after the code unit 17 will not eliminate the layout conflict. Although the software tool 205 may also be implemented to attempt to place code units in different groups, such as placing the code unit between code units f8 and f9 or placing the code unit on its own, FIG. 2A illustrates the code unit f6 remaining as initially placed.

At a time 3, the software tool 205 determines a layout conflict between the code units f8 and f6, which have a caller-callee relationship. The software tool 205 arranges the code so that the code unit f8 is placed after the code units f9 and f10, thus eliminating the layout conflict between code units with a caller-callee relationship. The software tool 205 may be directed to inspect layout conflicts between code units beyond a direct caller-callee relationship. The code unit f8 has an indirect caller-callee relationship with the code unit f4 via the code unit f6. The software tool would examine the code representation 201 and determine that a layout conflict no longer occurs between the code units f8 and f4, because of the previous code placement at time 1. If the layout conflict still existed, though, the software tool 105 would move the code unit f8. In addition, the software tool may be implemented to identify tail call relationships (i.e., when control does not return to a caller directly from the callee) and ignore those conflicts.

FIG. 2B depicts a code representation generated by the software tool 205. At a time 4, the software tool 205 generates a new code representation 221 with code units placed to reduce if not eliminate overlapping memory mappings between code units with caller-callee relationships. Although FIG. 2B depicts a new code representation, the software tool 205 may alter the code representation 201 instead of generating a new code representation.

Figure 3:
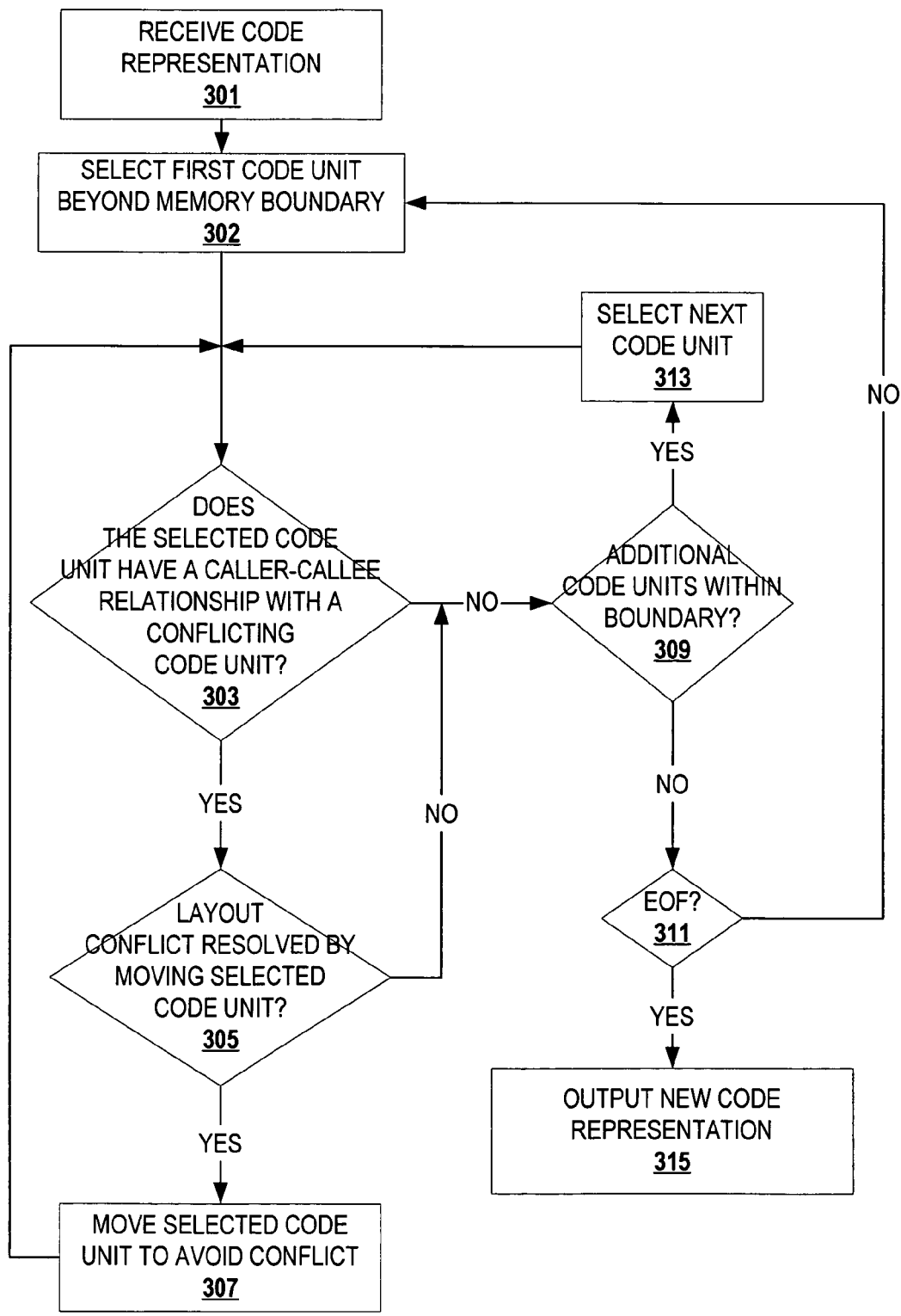
FIG. 3 depicts an exemplary flowchart for code placement to reduce overlapping memory mappings between code units with caller-callee relationships.

FIG. 3 depicts an exemplary flowchart for code placement to reduce overlapping memory mappings between code units with caller-callee relationships. At block 301, a code representation (e.g., a byte code, an object file, a source file, etc.) is received. At block 302, a first code unit is selected beyond a memory boundary. For example, referring to FIG. 2A, the code unit f3 is selected which is in the second memory boundary code unit group. At block 303, it is determined whether the selected code unit has a caller-callee relationship with a conflicting code unit. Referring to FIG. 2A again, the software tool 205 determines whether the code unit 13, which has an overlapping memory mapping with the code unit f1, has a caller-callee relationship with the code unit f1. If there is no layout conflict, then control flows to block 309. IF there is a layout conflict, then control flows to block 305.

At block 305, it is determined whether the layout conflict will be resolved by moving the selected code unit. If the layout conflict can be eliminated by moving the selected code unit, then control flows to block 307. If the layout conflict will remain despite moving the code unit, then control flows to block 309. Implementations may continue to attempt moving a code unit to a certain distance if the first move is insufficient to avoid the layout conflict with a caller/callee code unit.

At block 307, the selected code unit is moved to avoid the layout conflict. Control flows from block 307 to block 303.

At block 309, it is determined whether there are any additional code units in the memory boundary. If there are additional code units, then control flows to block 313. If there are no additional code units, then control flows to block 311. At block 311, it is determined whether the end of the code representation has been reached. If the end of the code representation has been reached, then control flows to block 315. If the code representation has not been reached, then control flows back to block 302. At block 315, a new code representation is output.

While the flow diagram shows a particular order of operations performed by certain realizations of the invention, it should be understood that such order is exemplary (e.g., alternative realizations may perform the operations in a different order, combine certain operations, overlap certain operations, perform certain operations in parallel, etc.). For example, additional operations may be performed to generate a call graph or annotate the call graph with temporal locality information, spatial locality information, etc. Furthermore, additional operations may be performed to tightly pack code units with a caller-callee relationship. For example, if a first code unit occupies only a portion of a cache line, the tool may pack in a second code unit, which has a caller-callee relationship with the first code unit, to occupy the remainder of that cache line instead of it remaining unoccupied.

The described invention may be provided as a computer program product, or software, that may include a machine-readable medium having stored thereon instructions, which may be used to program a computer system (or other electronic devices) to perform a process according to the present invention. A machine readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Figure 4:
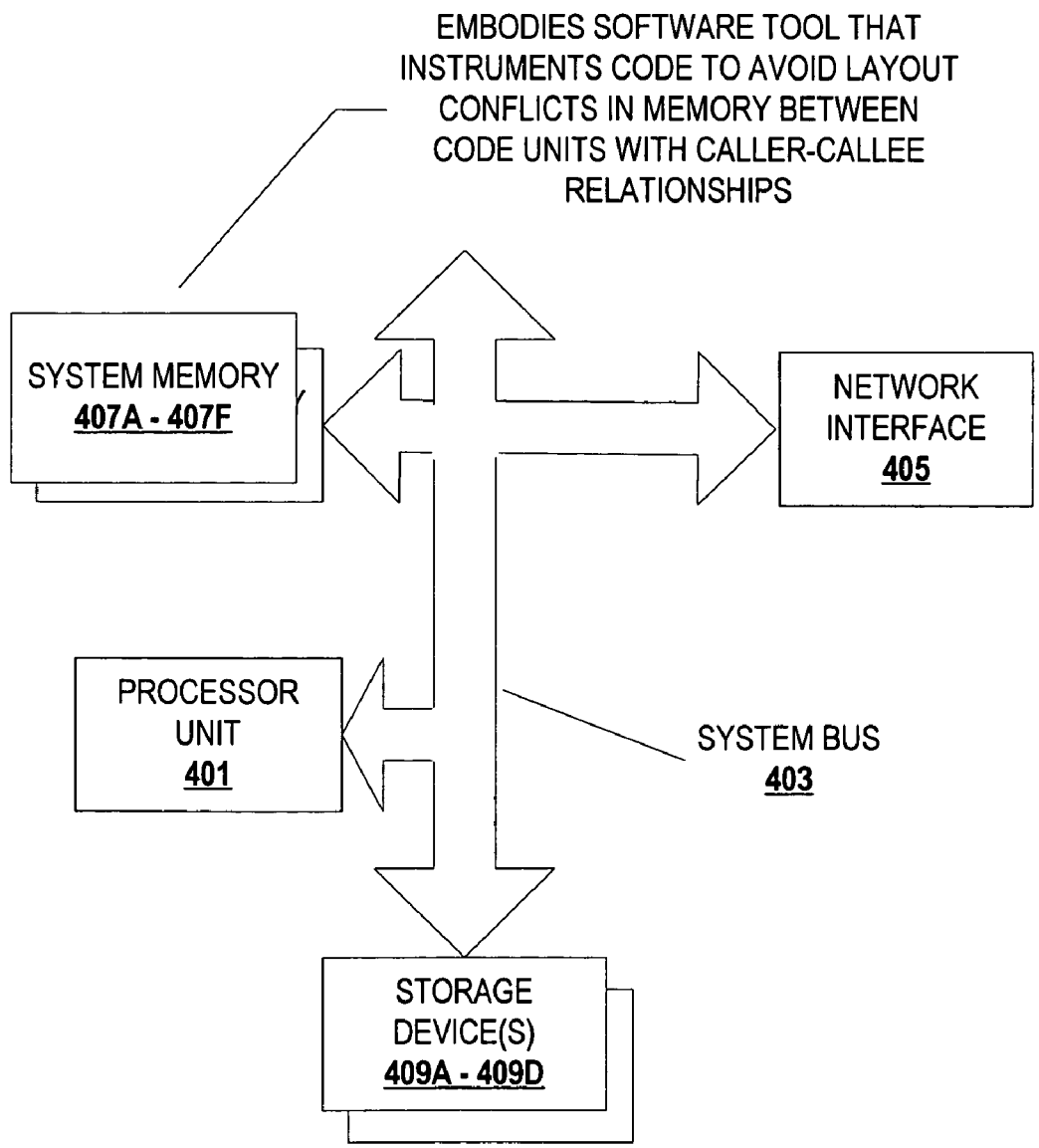
FIG. 4 depicts an exemplary computer system according to realizations of the invention.

FIG. 4 depicts an exemplary computer system according to realizations of the invention. A computer system 400 includes a processor unit 401 (possibly including multiple processors, a single threaded processor, a multi-threaded processor, a multi-core processor, etc.). The computer system 400 also includes a system memory 407A-407F (e.g., one or more of cache, SRAM DRAM, RDRAM, EDO RAM, DDR RAM, EEPROM, etc.), a system bus 403 (e.g., LDT, PCI, ISA, etc.), a network interface 405 (e.g., an ATM interface, an Ethernet interface, a Frame Relay interface, etc.), and a storage device(s) 409A-409D (e.g., optical storage, magnetic storage, etc.). Realizations of the invention may include fewer or additional components not illustrated in FIG. 4 (e.g., video cards, audio cards, additional network interfaces, peripheral devices, etc.). The processor unit 501, the storage device(s) 409A-409D, the network interface 405, and the system memory 407A 407F are coupled to the system bus 403. The system memory 407A-407F embodies a software tool that instruments code to avoid layout conflicts between caller/callee code units.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. Functionality may be separated or combined in blocks differently in various realizations of the invention or described with different terminology. These and other variations, modifications, additions, and improvements may fall within the scope of the invention as defined in the claims that follow.

What is claimed is:

1. An article of manufacture providing a code preparation environment embodied on one or more machine-readable storage media, comprising:
   instructions, stored in at least one machine-readable medium and executable by at least one processing unit, that:
   determine whether code units with caller-callee relationships have overlapping memory mappings between at least one caller code unit of the code units and at least one corresponding callee code unit called by the at least one caller code unit within a computer system that executes the code units by checking whether a boundary of a memory range of the at least one caller code unit falls within a memory range of the at least one corresponding callee code unit or a boundary of the memory range of the at least one corresponding callee code unit falls within the memory range of the at least one caller code unit;
   generates and utilizes a call graph representing the caller-callee relationships; and
   instruments the code units to at least reduce those of the code units that have overlapping memory mappings between the at least one caller code unit and the corresponding callee code unit called by the at least one caller code unit, the instrumenting including tightly packing one or more of code units that are called frequently and code units that execute concurrently into memory.

2. The article of manufacture of claim 1, wherein instrumenting the code units comprises changing the memory mappings of at least some of the code units to eliminate overlapping of memory mappings thereof.

3. The article of manufacture of claim 1, wherein the instructions determine the caller-callee relationships.

4. The article of manufacture of claim 1, wherein the code unit instrumentation is subject to organization of the code units in accordance with execution frequency of the code units.

5. The article of manufacture of claim 1, wherein the code unit instrumentation is also in accordance with at least one of spatial locality and temporal locality of the code units.

6. The article of manufacture of claim 1, wherein the code unit instrumentation is in accordance with boundaries of the memory.

7. The article of manufacture of claim 1, wherein the memory includes instruction cache.

8. The article of manufacture of claim 1, wherein the call graph is annotated with profile information.

9. The article of manufacture of claim 1, wherein the code preparation environment includes at least one of a linker and a compiler.

10. The article of manufacture of claim 1, wherein the memory mappings include mappings to cache lines, mappings to page, or mappings to segments.

11. A method for code placement comprising:
    placing, utilizing at least one processing unit, a first code unit and a second code unit of a code representation, stored in a machine-readable storage medium, to avoid memory layout conflict between the first and second code units, wherein the placing is based, at least in part, on the first and second code units having a caller-callee relationship where the first code unit calls the second code unit, wherein the memory layout conflict between the first and second code units occurs when a boundary of a memory range of the first code unit falls within a memory range of the second code unit or a boundary of the memory range of the second code unit falls within the memory range of the first code unit;

generating and utilizing a call graph representing the caller-callee relationships between the first and second code units; and instrumenting code units of the code representation to at least reduce those of the code units that have overlapping memory mappings between at least one caller code unit and a corresponding callee code unit called by the at least one caller code unit, the instrumenting including tightly packing one or more of code units that are called frequently and code units that execute concurrently into memory.

12. The method of claim 11, wherein the memory layout conflict includes the first and second code units being mapped to overlapping locations in a memory of a computer system to execute the first and second code units.

13. The method of claim 11, further comprising placing the first and second code units in accordance with profile information.

14. The method of claim 13, wherein the profile information indicates at least one of temporal locality and spatial locality.

15. The method of claim 11, wherein the code units include at least one of a function, a method, a procedure, and a library.

16. The method of claim 11, wherein the placing comprises arranging the first and second code units in an intermediate code representation to avoid the layout conflict.

17. The method of claim 11, further comprising placing a third code unit in the code representation to avoid layout conflict between the third code unit and the first code unit, wherein the third code unit has a caller-callee relationship with the second code unit.

18. The method of claim 11, wherein the placing occurs either during translation of a source code into the code representation or during linking of the code representation.

19. The method of claim 11, further comprising determining the caller-callee relationship between the first and second code units.

20. An apparatus comprising:

a memory operable to host a plurality of code units; and a processing unit, coupled to the memory, operable to execute instructions for placing code units of the plurality of code units in a code representation into the memory to at least reduce those code units, which have caller-callee relationships and overlapping mappings between at least one caller code unit of the code units and at least one corresponding callee code unit called by the at least one caller code unit, the processing unit operable to execute instructions for generating and utilizing a call graph representing the caller-callee relationships between the at least one caller and at least one callee code units, the processing unit operable to instrument the code units to at least reduce those of the code units that have overlapping memory mappings between the at least one caller code unit and the corresponding callee code unit called by the caller code unit, the instrumenting including tightly packing one or more of code units that are called frequently and code units that execute concurrently into memory; wherein the overlapping memory mapping between the at least one caller code unit and the at least one corresponding callee code unit occurs when a beginning boundary of a memory range of the at least one caller code unit falls within a memory range of the at least one corresponding callee code unit, an ending boundary of the memory range of the at least one caller code unit falls within the memory range of the at least one corresponding callee code unit, a beginning boundary of the memory range of the at least one corresponding callee code unit falls within the memory range of the at least one caller code unit, or an ending boundary of the memory range of the at least one corresponding callee code unit falls within the memory range of the at least one caller code unit.

21. The apparatus of claim 20 further, comprising means for determining the caller-callee relationships.

22. The apparatus of claim 20, further comprising means for determining the those of the code units with overlapping memory mappings.

23. The apparatus of claim 20, wherein the code representation includes an executable code representation or an intermediate code representation.

24. The apparatus of claim 20, wherein the memory mappings include page mappings, cache line mappings, or segment mappings.

25. The apparatus of claim 20, further comprising means for placing the code units to be tightly packed into the memory for those of the code units that are adjacent in execution flow.

26. A computer program product embodied on one or more machine-readable storage media, the computer program product comprising:

a first sequence of instructions, stored in at least one machine-readable media, executable by at least one processing unit to receive a code representation that includes a plurality of code units;

a second sequence of instructions, stored in the at least one machine-readable media, executable by the at least one processing unit to arrange the plurality of code units to at least reduce layout conflicts among those of the plurality of code units with caller-callee relationships between at least one caller code unit of the plurality of code units and at least one corresponding callee code unit called by the at least one caller code unit, wherein a layout conflict among the at least one caller code unit and the at least one corresponding callee code unit occurs when a boundary of a memory range of the at least one caller code unit falls within a memory range of the at least one corresponding callee code unit or a boundary of the memory range of the at least one corresponding callee code unit falls within the memory range of the at least one caller code unit;

a third sequence of instructions, stored in the at least one machine-readable media, executable by the at least one processing unit to generate and utilize a call graph representing the caller-callee relationships between the at least one caller code unit and the at least one callee code unit; and a fourth sequence of instructions, stored in the at least one machine-readable media, executable by the at least one processing unit to instrument the plurality of code units to reduce those of the plurality of code units that have overlapping memory mappings between the at least one caller code unit and the at least one corresponding callee code unit, the instrumenting including tightly packing one or more of code units that are called frequently and code units that execute concurrently into memory.

27. The computer program product of claim 26, wherein the plurality of code units includes at least one of functions, methods, procedures, and libraries.

28. The computer program product of claim 26, further comprising:

a fifth sequence of instructions, stored in the at least one machine-readable media, executable by the at least one processing unit to determine the caller-callee relationships among the plurality of code units.

29. The computer program product of claim 26, wherein the call graph includes annotations that indicate profile information.

30. The computer program product of claim 29, wherein arrangement of the code units is based, at least in part, on the annotations.

31. The computer program product of claim 30, wherein the profile information includes at least one of temporal locality and spatial locality.

32. The computer program product of claim 26, further comprising:
   a third sequence of instructions, stored in the at least one machine-readable media, executable by the at least one processing unit to determine the layout conflicts between the at least one caller code unit of the plurality of code units and the at least one corresponding callee code unit called by the at least one caller code unit.

33. The computer program product of claim 26, further comprising linker code.

34. The computer program product of claim 26, wherein a new intermediate code representation is generated in accordance with the arrangement of code units by the second sequence of instructions.

* * * * *

UNITED STATES PATENT AND TRADEMARK OFFICE
CERTIFICATE OF CORRECTION

PATENT NO. : 7,703,087 B1
APPLICATION NO. : 11/009886
DATED : April 20, 2010
INVENTOR(S) : Raj Prakash Page 1 of 1

It is certified that error appears in the above-identified patent and that said Letters Patent is hereby corrected as shown below:

In column 4, line 48, delete "13," and insert -- f3, --, therefor.

In column 8, line 7, in claim 21, delete "20 further," and insert -- 20, further --, therefor.

Signed and Sealed this
Twelfth Day of April, 2011

David J. Kappos
*Director of the United States Patent and Trademark Office*